J. R. Wood,
Butcher's Steel.
No. 91,505. Patented June 15, 1869.
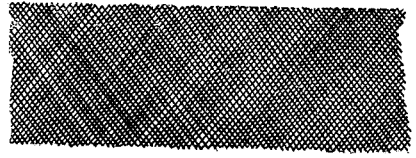
Witnesses;
Simon S. Lophan
William Brooksley
Inventor;
James R. Wood,

United States Patent Office.

JAMES R. WOOD, OF PROVIDENCE, RHODE ISLAND, ASSIGNOR TO CHARLES G. TAFT, JR., OF SAME PLACE.

Letters Patent No. 91,505, dated June 15, 1869.

IMPROVED BUTCHERS' STEEL.

The Schedule referred to in these Letters Patent and making part of the same.

*To all whom it may concern:*

Be it known that I, JAMES R. WOOD, of the city and county of Providence, in the State of Rhode Island, have originated and invented a certain new and useful Butchers' Steel, and a novel mode of manufacturing the same.

In butcher's steels, as ordinarily manufactured, the cutting-edges are produced by making longitudinal grooves therein. To a limited extent, they are also made with cutting-edges prepared by hand with a tool, as in cutting files.

In the latter case, however, the knife is sharpened by being drawn in one direction only.

To produce butcher's steels which will cut in two longitudinal directions, as well as to produce them economically, is the object of my invention.

To enable persons skilled in the art to make and use my invention, I hereby declare the following specification, taken in connection with the drawing furnished, and forming a part of the same, to be a true, clear, and exact description thereof.

The drawing represents merely the form of the cutting-teeth. It will be seen that they differ from file-teeth in that they have no barbs, but present an angle on each of their four sides, corresponding one with the other.

These teeth are cut in the following manner:

A circular block of steel, mounted upon a solid shaft, is truly turned to centres. The size is immaterial as to diameter or width, but I prefer, say one inch in diameter, and one-half inch wide.

The periphery of this circular block is then, by hand, with die-cutting tools, in the ordinary manner, under a glass, carefully cut in teeth precisely like those desired upon the butchers' steels.

Once having beeen well finished, this die is hardened.

Steel blanks having been prepared, and temper well drawn, are then placed in a screw-cutting lathe, and secured by a dog and an open centre. The die, with its axle, is mounted upon a rest in an obvious manner, and attached to the screw-cutting feed-motion, and pressed, with screws, well forward against the blank, and power applied to the lathe. Pressure upon the back side of the revolving blank, by means of a lever, forces the blank and die together, causing the teeth to be transferred, while the feed-motion regulates the work until the whole blank is finished.

After being thus prepared, the steels are hardened, by any of the well-known processes, and are ready for use.

Having thus described my invention,

I claim as new, and desire to secure by Letters Patent—

The improved butcher's steel, herein described, with its cross-cut teeth, manufactured in the manner, and for the purposes specified.

JAMES R. WOOD.

Witnesses:
SIMON L. LOPHAM,
WILLIAM ROCKSLY.